United States Patent Office 3,011,482
Patented Dec. 5, 1961

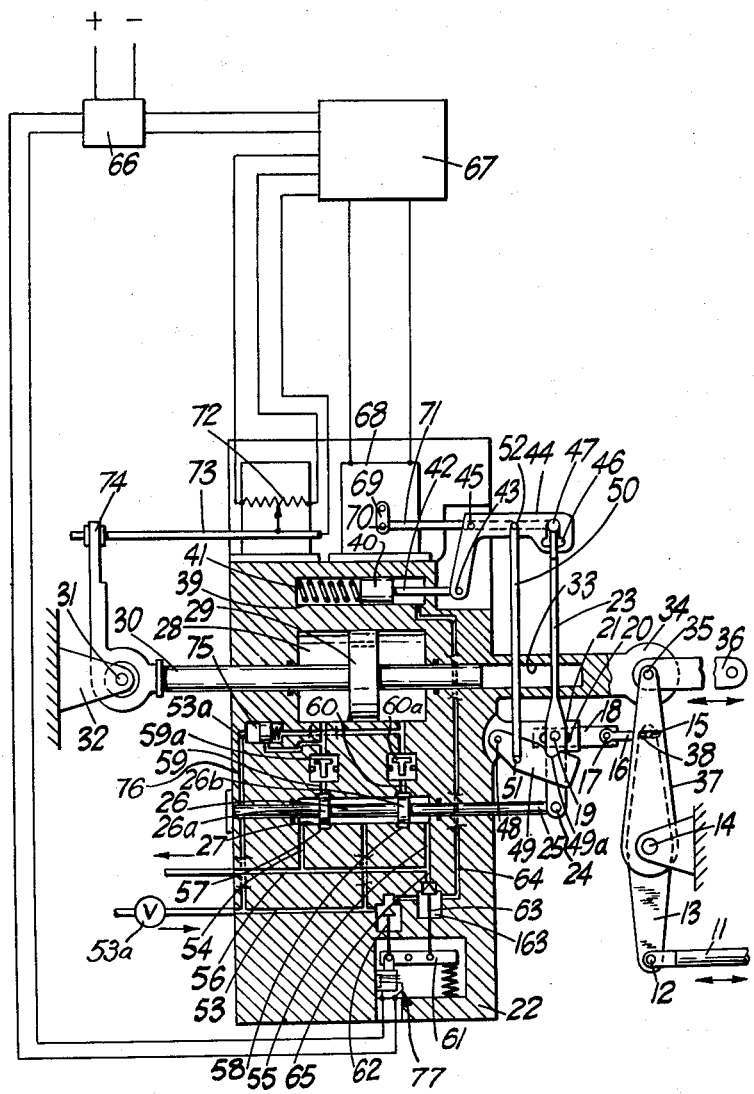

3,011,482
SERVO SYSTEM FOR AIRCRAFT CONTROLS
Arthur Ernest Henry Elmer and Robert Paul Smith, Gloucester, England, assignors to British Messier Limited, Gloucester, England, a British company
Filed Aug. 12, 1957, Ser. No. 677,558
Claims priority, application Great Britain Aug. 14, 1956
4 Claims. (Cl. 121—41)

This invention relates to flying control systems for aircraft and is concerned more particularly with the type of system which can be set so that manual movement of a pilot's control member can directly effect displacement of the associated control surface, or alternatively, can be set so that said movement initiates displacement of said surface through a power system, e.g. a hydraulic servo system. Such a control system may also be operated under the control of an automatic pilot.

The invention contemplates the provision of a novel control system of the type referred to, in which linkage is provided such that when the power system is brought into operation to effect displacement of a control surface, the direct manual connection from the pilot's control member to the control surface is interrupted automatically, and upon cut-out of the power system or failure thereof, automatic reversion to the direct manual linkage is effected.

According to one aspect of the invention, a control system of the above type comprises a fluid-pressure-operated piston-and-cylinder unit or jack, a servo-valve for controlling admission and exhaust of pressure fluid to and from the jack, and a latch control cylinder having a connection to the pressure fluid supply line. The jack, servo-valve and latch control cylinder are disposed all in one body or casing as a movable unitary structure that is connected to the member to be controlled, and the jack piston rod projects from the casing and is connected to a fixed part of the aircraft's structure. An operator's control element is operatively connected to the servo-valve, and a movable latch is provided on the casing to engage the operative connections between said control element and the servo-valve and thereby couple the control element to the casing to move it by direct manual effort. The latch is shifted by the latch control cylinder in such manner that the latch is inoperative when pressure fluid is supplied to the casing and is brought into engagement automatically when the supply pressure is cut off.

In the preferred form, the system is arranged for alternative control by an automatic pilot. In this embodiment there is provided a motor on the casing responsive to signals transmitted from the automatic pilot, driving connections between the motor and the servo-valve that are subject to the action of the latch control cylinder. These driving connections are inoperative when pressure fluid is supplied to said cylinder but capable of being rendered operative when the latch control cylinder is exhausted. The system includes valve means operable when the automatic pilot is brought into use to disconnect the latch control cylinder from the pressure supply line and connect it to exhaust.

The following is a description by way of example of one embodiment of the invention, reference being made to the accompanying drawing.

A pilot's input link 11 is connected at 12 to the lower end of a lever 13 which in turn is pivotally connected between its ends at 14 to a fixed structural part. At its upper end this lever is pivotally connected at 15 to a link 16 which at its other end 17 is pivotally connected to a sliding member 18. This member is provided with a pin 19 which protrudes through a slot 20 in an extension 21 of a casing 22, to the exterior thereof. The member 18 is capable of sliding movement with respect to this extension 21 and the pin 19 forms an intermediate pivotal attachment for a differential lever 23. The lower extremity of the lever 23 is pivotally connected at 24 to the operating rod 25 of a jack valve 26. This jack valve is housed in a bore 27 in the casing 22, the latter also incorporating a jack cylinder 28 within which a jack piston 29 is slidably mounted.

The rod 30 of the jack piston 29 extends to the left in the drawing to the exterior of the casing 22 and is pivotally connected at 31 to a fixed part 32 of the surrounding structure, and at the other end it is slidable in a bore 33 formed in an extension 34 of the casing 22. This extension is pivotally connected at 35 to an output link 36 which is connected with a control surface (not shown). A link 37 is at its upper end also connected to the pivot point 35, and at its lower end to the pivot 14. This link is provided with a transversely disposed slot 38 through which an extension of the pivot pin 15 protrudes.

A further bore 39 in the casing 22 houses a latch piston 40 which is urged to the right by a coil spring 41. The associated piston rod 42 extends to the right to the exterior of the casing where at 43 it is pivotally connected to a bellcrank lever 44 which in turn is pivotally mounted at 45 on the casing 22. The limb of this lever remote from the pivot 43 is provided at its extremity with an inverted T-shaped slot 46, radiused at the three extremities of the T. The upper extremity of the differential lever 23 is forked and a roller 47 is mounted between the limbs of the fork and located within the T-shaped slot.

Pivotally connected at 48 to the extension 21 of the casing 22 is a latch member 49 with a link 50 extending from a pivotal connection 51 thereon to a pivotal connection 52 between the pivot 45 and the T-shaped slot 46 on the lever 44. The latch member is provided on its upper edge with a detent notch 49a which is arranged to engage the pin 19 when the latch is in its uppermost position.

The casing is provided with a number of fluid passageways. A pressure inlet passageway 53 leads directly to the space in the bore 27 between lands 26a and 26b of the valve 26. Passageways 54 and 55 respectively lead from spaces to the left and right of these lands to an exhaust passage 56. Annular recesses 57 and 58 respectively align with lands 26a and 26b (when the valve 26 is in the equilibrium state). Passageways 59 and 60, each incorporating a one-way restrictor 59a and 60a for damping, respectively lead therefrom to the chambers in the cylinder 28 to the left and right of the jack piston 29.

A selector 61, electrically operated in any convenient manner, basically comprises two valves 62 and 63 arranged so that when one is closed the other is open. The valve 62 is incorporated in a passageway 64 which is branched from the passageway 53 and which leads to the chamber to the right of the latch piston 40. The passageway 64 enters and goes through the chamber 163 which contains the valve 63 and a passage 65 leads from the valve to exhaust passage 56.

The selector 61 is electrically operated by a solenoid 77 controlled by a switch 66 which at the same time controls the automatic pilot represented at 67. Signals are transmitted from the automatic pilot to a torque motor 68 mounted upon the casing 22. The output lever 69 of the torque motor is pivotally connected at 70 to a link 71 which at its opposite end is pivotally connected at 47 to the fork and roller on the differential lever 23.

A potentiometer 72 is mounted upon the casing 22, this transmitting feed-back signals to the automatic pilot.

The sliding member 73 of the potentiometer is conveniently fixed to a right angle extension 74 from the left hand end of the piston rod 30.

A by-pass valve 75 is provided in a passageway 76 taken from the passageway 59 to the passageway 60. A further passageway 53a is branched from the passageway 53 and communicates with a piston operating this by-pass valve 75 in a manner such that when the hydraulic pressure supplied through passageway 53 is cut off the by-pass valve is opened.

The method of operation of the apparatus will now be described:

Under manual control suitable valve means 53a ensures that no pressure fluid is supplied through passageway 53. Since therefore, no pressure fluid passes through passageway 64, the latch piston 40 is urged to the right in the drawing by the coil spring 41 so that the lever 44 is moved to its uppermost position about its pivot 45. By virtue of the link 50 the latch member 49 also moves upwardly about its pivot 48 so that the detent notch 49a engages the pivot pin 19. In this way there is a direct mechanical linkage from the pilot's input link 11, through the lever 13, the link 16, the member 18, and the latch 49 to the casing 22. Since there is no hydraulic pressure in the line 53 the by-pass valve 75 is open so that the left and right hand sides of the jack piston 29 are placed in communication, and no hydraulic resistance is offered to manual movements of the system.

When it is desired to change to hydraulic power operation the valve means referred to in the first sentence of the last paragraph is opened to admit pressure fluid through passageway 53 to the casing 22. Under these conditions, assuming the selector 61 to be in the position drawn, with the valve 62 open hydraulic fluid flows to the right hand side of the latch piston 40, in addition to the valve 26 and the piston of the by-pass valve 75. Consequently, the jack valve 26 and jack will be enabled to operate normally and the lever 44 will move about its pivot 45 in a clockwise direction so that the latch member 49 will also move in a clockwise direction about its pivot 48 to remove the detent from the pivot pin 19. In this way input signals from the pilot's link 11 to the lever 13 will result in corresponding movement of the valve 26 and the position of the casing 22 will be adjusted accordingly by the jacks, its movement being transmitted through the link 36 to the associated control surface. This movement will of course follow up the movement of the valve 26 so that wherever the pilot's input link stops moving the system will reach a corresponding state of equilibrium. It will be seen that the controlling movement of the differential lever 23 is about the pivotal connection afforded by the roller 47 which at this time has a restraining seating in the upper end of the inverted T-slot 46.

If under these conditions a hydraulic pressure failure occurs then the latch piston 40 will move to the right to cause engagement of the latch member 49 with the pivot pin 19 to achieve direct manual control. At the same time the by-pass valve 75 will be opened automatically thereby allowing free flow of oil across the jack piston 29.

When it is desired to change from power control to the control of the automatic pilot, the switch 66 is operated so that the solenoid 77 actuates the selector 61 close valve 62 and open valve 63. In this way the chamber to the right of the latch piston 40 is placed in communication with the exhaust passage 56. Hence the piston 40 is urged to the right by the coil spring 41 so that the lever 44 moves in an anticlockwise direction about its pivot 45, the roller 47 engaging in the lower part of the inverted T-slot 46, and the latch member 49 moving about its pivot 48 so that the detent 49a engages the pivot pin 19. Under the control of the automatic pilot 67 controlling movements of the output lever 69 of the torque motor 68 are transmitted by link 71 to the differential lever 23 which is angularly displaced about the pivot 19, thereby imparting controlling movements to the valve 26 and thus the casing 22 is moved by the jack accordingly. The movements of the casing result in corresponding adjustment of the potentiometer 72 and feed-back signals therefrom to the automatic pilot cancel out the signal to the torque motor when the desired movement of the associated control surface has been achieved. The spring beneath the selector beam 61 is provided so that if when the system is under automatic pilot control there is an electrical power failure, then the spring will operate to close the valve 63 and open the valve 62. In this way hydraulic fluid under pressure in the contduit 53 will pass into the conduit 64, and thus displace the piston 40 to the left against the effort of the coil spring 39. Hence the lever 44 will move in a clockwise direction so that the roller 47 will engage the upper part of the inverted T-slot 46. At the same time of course, the latch member 49 will also move in a clockwise direction away from the pivot pin 19. Thus the system is automatically returned from automatic pilot operation to hydraulic power operation.

In the event of a "runaway" which necessitates the pilot having to take immediate control he may accomplish this by applying force to the control column, thus breaking out the differential lever 23 from the detent in the latch member 49. The sides of the latch member detent notch are suitably sloped for this purpose. In this way any incorrect auto pilot signal can be swamped.

We claim:

1. A servo mechanism comprising an input member, a hydraulic servo motor having a motive member which forms an output member for the mechanism, valve means mounted on the motive member and having a valve member which is movable to control a supply of servo fluid to the servo motor, a swing link having pivotal connections at respective spaced points in its length to the said motive member, to the input member and to the movable valve member, and latch means mounted on said motive member which latch means is movable between an inoperative position in which the input member can transmit a control movement to the movable valve member by swinging the link about its connection to the motive member and an operative position in which the latch means locks the input member to the motive member.

2. A servo mechanism comprising an input member, a hydraulic servo motor having a motive member which forms an output member for the mechanism, valve means mounted on the motive member and having a valve member which is movable to control a supply of servo fluid to the servo motor, an automatically operable control element for controlling movement of the motive member, which element is mounted on the motive member, a swing link having pivotal connections at spaced points in its length to the control element, to the input member, and to the movable valve member, means for releasably fixinging, relative to the motive member, the point of connection of the control element to the link against movement laterally of the link, latch means mounted on said motive member, which latch means is movable between an inoperative position in which the input member can transmit a control movement to the movable valve member by swinging the link about its point of connection to the control element and an operative position in which the latch means locks the input member to the motive member.

3. A servo mechanism as claimed in claim 2, wherein the releasable fixing means comprises a part mounted on the motive member and having therein a T-shaped cam slot, the point of conection of the control element to the link being engaged in the slot and the leg of the T extending in the same direction as the link, and means for moving the part so that the leg of the T moves lengthwise of the link between a first position in which the point of connection of the control element to the link is restrained from movement laterally of the link by the leg of the T and a second position in which the point of connection is engaged in the cross-portion of the T and can move laterally of the link.

4. A servo mechanism as claimed in claim 3, wherein the latch means is connected to the said part to move therewith, the latch means being in its inoperative position when the said part is in its first position and being in its operative position when the part is in its second position, and wherein the operating element when inoperative is locked against movement relative to the motive means.

References Cited in the file of this patent
UNITED STATES PATENTS

| | | |
|---|---|---|
| 2,551,273 | Lisle et al. | May 1, 1951 |
| 2,678,177 | Chenery et al. | May 11, 1954 |
| 2,801,618 | Place et al. | Aug. 6, 1957 |
| 2,819,030 | Christensen | Jan. 7, 1958 |
| 2,819,031 | Christensen | Jan. 7, 1958 |
| 2,823,879 | Smith et al. | Feb. 18, 1958 |
| 2,855,900 | Elmer | Oct. 14, 1958 |
| 2,859,926 | Westbury | Nov. 11, 1958 |